Figure 1:
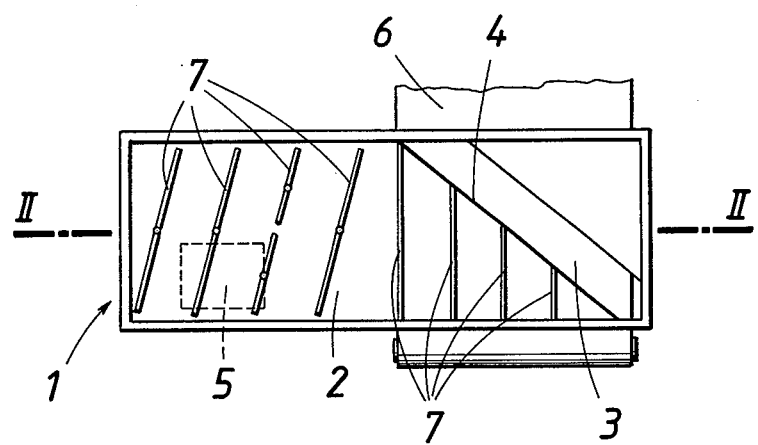

United States Patent [19]
Nagl

[11] Patent Number: 4,465,592
[45] Date of Patent: Aug. 14, 1984

[54] VIBRATING CONVEYOR FOR DELIVERING A STREAM OF GREEN PELLETS OF EVEN THICKNESS

[75] Inventor: Martin Nagl, Rutzenmoos, Austria

[73] Assignee: Voest-Alpine Aktiengesellschaft, Linz, Austria

[21] Appl. No.: 382,584

[22] Filed: May 27, 1982

[30] Foreign Application Priority Data

Jul. 27, 1981 [AT] Austria .................................. 3295/81

[51] Int. Cl.³ .......................... B07B 1/08; B65G 47/24
[52] U.S. Cl. ..................................... 209/236; 209/247; 209/254; 209/240; 198/614; 198/771; 75/5; 266/178
[58] Field of Search ............... 209/236, 240, 247, 254, 209/920; 198/502, 503, 505, 614, 771; 222/199, 200, 198; 266/178–180; 75/5

[56] References Cited

U.S. PATENT DOCUMENTS

| 2,737,295 | 3/1956 | Symons | 209/254 |
| 3,524,533 | 8/1970 | Miller et al. | 198/711 |
| 3,877,585 | 4/1975 | Burgess . | |
| 3,889,796 | 6/1975 | Baily et al. | 198/502 |
| 3,915,283 | 10/1975 | Munck | 209/247 |

FOREIGN PATENT DOCUMENTS

| 267236 | 5/1965 | Australia | 198/502 |
| 2839996 | 6/1979 | Fed. Rep. of Germany | 198/614 |
| 415212 | 6/1974 | U.S.S.R. | 222/199 |
| 583062 | 12/1977 | U.S.S.R. | 222/200 |

*Primary Examiner*—David L. Lacey
*Attorney, Agent, or Firm*—Kurt Kelman

[57] ABSTRACT

A vibrating conveyor for delivering a stream of green pellets having a predetermined average diameter to a conveying surface of a wide belt conveyor. The vibrating conveyor has a vibrating deck having a discharge edge and conveys the green pellets along a conveyance path to the discharge edge. The discharge edge extends at an acute angle to the conveyance path. A series of elongated distributing bars or rows of bosses protrude upwardly from an upper surface of the deck along the entire conveyance path and extend along lines transverse to, and spaced along, the conveyance path, the elongated distributing bars or bosses having a height of 7.5 to 30 mm.

9 Claims, 5 Drawing Figures

VIBRATING CONVEYOR FOR DELIVERING A STREAM OF GREEN PELLETS OF EVEN THICKNESS

This invention relates to a vibrating conveyor in apparatus for charging a traveling grate with green pellets. The apparatus comprises a wide belt conveyor and the vibrating conveyor precedes the wide belt conveyor and has a vibrating deck having a discharge edge which defines an acute angle with the direction of conveyance of the vibrating conveyor and extends throughout the width of the conveying surface of the wide belt conveyor.

Even relatively small irregularities in the distribution of pellets of ground and moistened ore on a traveling grate on which the pellets are fired will result in a vibration of the gas permeability of the layer of pellets and this may adversely affect the firing of the pellets on the traveling grate. For this reason, the pellets must be distributed as uniformly as possible although this is difficult because the green pellets have only a relatively low compressive strength.

It is known that a uniform distribution of green pellets over the width of the traveling grate can be obtained by means of a distributor which comprises a vibrating conveyor having a discharge edge extending at an acute angle to the direction of conveyance of the vibrating conveyor to distribute the stream of pellets conveyed by the vibrating conveyor to form on the wide belt conveyor a stream of green pellets which has a width that is as large as the length of the discharge edge. When the pellets to be fired have thus been distributed over the required width, they are delivered to the traveling grate by the wide belt conveyor, which may be succeeded by a roller conveyor. The thickness distribution of the layer of pellets on the wide belt conveyor will depend on the thickness distribution of the layer across the width of the vibrating conveyor. For this reason, the formation of a layer of constant thickness on the traveling grate will depend to a large extent on the uniform distribution of the pellets on the vibrating deck of the vibrating conveyor, regardless of the feeding of the green pellets to the vibrating conveyor. In known vibrating conveyors, such a uniform distribution of the pellets before the discharge edge cannot be obtained at all or can be obtained only if the vibrating conveyor is relatively long although this is undesirable for other reasons.

It is an object of the invention so to improve an apparatus of the kind described first hereinbefore by simple means that a uniform distribution of pellets is ensured on a relatively short vibrating conveyor and the tendency of the green pellets to agglomerate on the vibrating conveyor is eliminated.

This object is accomplished in accordance with the invention by arranging upwardly protruding distributing bars or rows of bosses extending transversely to the direction of conveyance of the vibrating conveyor on the upper surface of the vibrating deck of the vibrating conveyor, the bars or bosses having a height which is 0.5 to 2 times the average diameter of the green pellets.

For instance, in a vibrating conveyor intended to convey pellets having an average particle size of 15 millimeters, the distributing bars or bosses will have a height of 7.5 to 30 mm and will preferably have a height of 15 mm.

The distributing bars or rows of bosses ensure that the green pellets on the vibrating conveyor will be rapidly distributed during their conveyance over a short distance because the transversely extending distributing bars or rows of bosses will promote a transverse movement of the green pellets. As a result, the vibrating deck will be covered with a deposited layer which consists of the material of the green pellets and which adjacent to the distributing bars or rows of bosses has elevated portions which will ensure the desired distribution. This layer constitutes a desirable protective layer protecting the vibrating deck from the wear which is otherwise inevitable.

Surprisingly, it has been found that an agglomeration of the green pellets can be effectively prevented by the provision of the distributing bars or rows of bosses. In this connection, the height of the distributing bars or bosses is significant. It has been found that the height of the bars or bosses must be at least one-half of the average diameter of the green pellets if the desired result is to be produced. As the thickness of the layer which is deposited on the vibrating deck increases with the height of the bars or bosses and this deposited layer must not have an excessive thickness, particularly to prevent an excessive weight, the height of the bars or bosses should not exceed twice the average diameter of the green pellets. Particularly desirable conditions will be obtained if the height of the distributing bars or bosses equals the average diameter of the green pellets.

Figure 2:
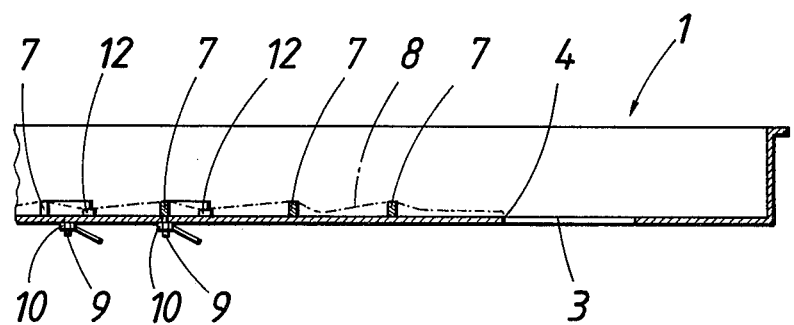
Figure 3:
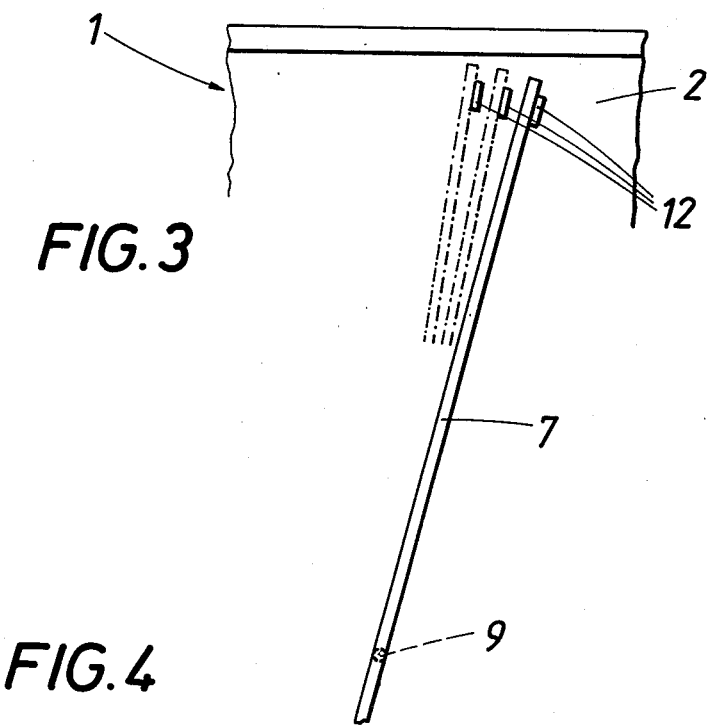
Figure 4:
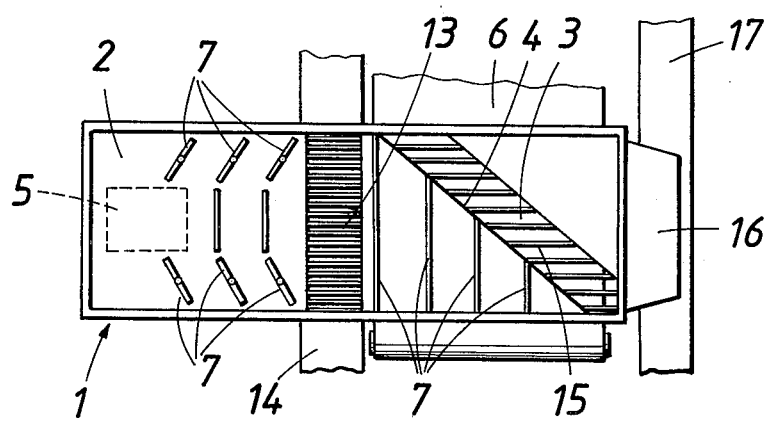
Figure 5:
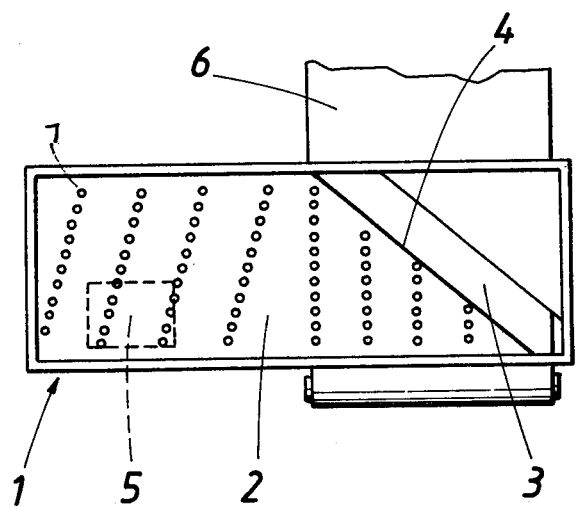

Embodiments of the invention are shown by way of example on the drawing, in which:

FIG. 1 is a simplified top plan view showing a vibrating conveyor according to the invention and used in apparatus for charging a travelling grate with green pellets, FIG. 2 is an enlarged longitudinal sectional view taken on line II—II in FIG. 1 and showing the vibrating conveyor, FIG. 3 is a top plan view showing a distributing bar which extends at an adjustable acute angle to the direction of conveyance, FIG. 4 is a view similar to FIG. 1 and showing another embodiment of the vibrating conveyor, and FIG. 5 is a like view of a vibrating conveyor with distributing bosses.

The vibrating conveyor 1 can be driven in a conventional manner by eccentric motors (not shown). The vibrating conveyor 1 comprises a vibrating deck 2 which terminates in a discharge edge 4 and the conveyed pellets drop through discharge slot 3. The green pellets are delivered to a receiving portion 5 of the vibrating deck 2 by means of a belt conveyor, not shown. The receiving portion 5 is indicated in broken lines. As the green pellets are conveyed from the receiving portion 5 to the discharge edge 4, they are uniformly distributed throughout the width of the vibrating deck 2 and are subsequently discharged onto a wide belt conveyor 6 which succeeds the vibrating conveyor 1. The discharge edge 4 extends throughout the width of the conveying surface of the wide belt conveyor 6 so that the stream of pellets conveyed by the vibrating conveyor 1 is uniformly distributed over the width of the conveying surface of the wide belt conveyor 6 and the latter can deliver the green pellets to a succeeding traveling grate to form a uniform layer of pellets thereon.

To ensure a uniform distribution of the green pellets on the vibrating deck 2 of the vibrating conveyor 1 during their conveyance over a short distance, upwardly protruding distributing bars 7 of approximately the same height as the average diameter of the conveyed green pellets extend over the top surface of deck 2. These distributing bars 7 cause a layer of pellet material to be deposited on the vibrating deck, which has elevated portions adjacent distributing bars 7, as is indicated in FIG. 2 in phantom lines 8. This layer will protect the vibrating deck 2 from the wear, which otherwise would be inevitable, and also changes the conditions under which the conveyed green pellets impinge on the vibrating deck. It is believed that this effect, in conjunction with the resulting moisture conditions in the layer of green pellets close to the vibrating deck, is the reason why the green pellets do not agglomerate.

The distributing bars covered with the deposited pellet material impart to the green pellets a component of movement tranversely to the direction of conveyance of the vibrating conveyor so that the green pellets will be more uniformly and more rapidly distributed across the width of the vibrating deck 2. A desired component of movement can be ensured by inclining distributing bars 7 at an acute angle to the direction of conveyance of the vibrating conveyor, particularly in the receiving portion 5. For instance, if the receiving portion is arranged asymmetrically on deck 2, as shown in FIG. 1, the inclined distributing bars will ensure tht the green pellets fed onto the vibrating deck near one side wall thereof will be distributed throughout the width of the vibrating deck as far as to its opposite side wall during their conveyance over a short distance. The inclined distributing bars are succeeded in the direction of conveyance by distributing bars 7 extending at right angles to the direction of conveyance and which eliminate any variations in the thickness of the layer so that the green pellets discharged across the discharge edge 4 can form a wider layer having a uniform thickness.

If the green pellets are received by the vibrating deck 2 in a central portion thereof, as is shown in FIG. 4, they must be uniformly distributed toward both sides. This is effected by inclined distributing bars extending at equal and opposite acute angles to the direction of conveyance.

The acute angle at which the inclined bars 7 extend with respect to the direction of conveyance can be adjusted to adapt to different conditions if the inclined distributing bars are pivotally adjustable. For this purpose, each distributing bar 7 carries a screw-threaded stud 9 which extends through a bore in the vibrating deck and which is fixed to vibrating deck 2 by nut 10. The vibrating deck 2 carries a plurality of stops 12 which are radially spaced from the stud 9, and the stud constitutes a pivotal axis for the distributing bar. The stops 12 are selectively engageable by the distributing bar 7 to define different acute angles between the bar and the direction of conveyance of the vibrating conveyor. As the fixing nut 10 is tightened, the distributing bar 7 is forced against the vibrating deck 2 and held in its adjusted position by nut 10 in cooperation with the stop 12.

In accordance with FIG. 4, a fine sieve 13 is incorporated in the vibrating deck 2 between the inclined and perpendicularly extending distributing bars 7 to separate undesired fines from the green pellets and remove them by belt conveyor 14. A coarse sieve 15 inserted in the discharge slot 3 may be used to retain oversize pellets which are delivered through discharge hopper 16 to belt conveyor 17. As a result, the pellets charged onto the traveling grate are within a defined particle size range, as is desirable. Because any undersize and oversize particles have been removed by sieves 13 and 15, there is no need for a sieving roller conveyor between the wide belt conveyor and the traveling grate.

As shown in FIG. 5, the green pellets on the vibrating conveyor may be subjected to a similar distributing action by rows of bosses 7' provided instead of the distributing bars. These rows of bosses virtually constitute comblike distributing bars. For a distribution under certain conditions, the rows of bosses may extend along a curve or curved distributing bars may be used.

What is claimed is:

1. A vibrating conveyor for delivering a stream of green pellets having a predetermined average diameter to a conveying surface of a wide belt conveyor, the vibrating conveyor comprising
   (a) a vibrating deck having a discharge edge and operable to convey the green pellets along a conveyance path to the discharge edge, the discharge edge extending at an acute angle to the conveyance path, and
   (b) a series of elongated distributing means protruding upwardly from an upper surface of the deck along the entire conveyance path and extending along lines transverse to, and spaced along, the conveyance path, the elongated distributing means having a height which provides a uniform thickness distribution of the green pellets.

2. The vibrating conveyor of claim 1, wherein the elongated distributing means are rows of bosses.

3. The vibrating conveyor of claim 1, wherein the elongated distributing means are bars.

4. The vibrating conveyor of claim 1, wherein the vibrating deck has a receiving portion for the green pellets, the receiving portion being remote from the discharge edge and the elongated distributing means close to the receiving portion of the deck being inclined to define an acute angle with the conveyance path.

5. The vibrating conveyor of claim 4, wherein the elongated distributing means are bars, and further comprising means for adjusting the angular positions of the bars.

6. The vibrating conveyor of claim 4, wherein the elongated distributing means close to the discharge edge of the deck define a right angle with the conveyance path.

7. The vibrating conveyor of claim 6, further comprising a fine sieve arranged along the conveyance path between the inclined distributing means and the distributing means defining a right angle with the conveyance path.

8. The vibrating conveyor of claim 1, wherein the distributing means have a height of 7.5 to 30 mm.

9. The vibrating conveyor of claim 8, wherein the distributing means have a height of 15 mm.

* * * * *